US006515672B1

(12) United States Patent
Sheaffer et al.

(10) Patent No.: US 6,515,672 B1
(45) Date of Patent: Feb. 4, 2003

(54) MANAGING PREFETCHING FROM A DATA BUFFER

(75) Inventors: Gad S. Sheaffer, Haifa (IL); Roman Surgutchik, Karkur (IL); Oded Lempel, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,971

(22) Filed: Dec. 23, 1999

(51) Int. Cl.[7] .............................................. G06F 13/372

(52) U.S. Cl. ........................ 345/534; 345/535; 345/545; 710/56; 710/310

(58) Field of Search ................................ 345/501, 519, 345/535, 539, 545, 534, 546; 710/56, 310

(56) References Cited

U.S. PATENT DOCUMENTS 4,788,641 A * 11/1988 Ishiguro et al. ............. 711/113
5,446,839 A 8/1995 Dea et al. ................... 395/163
5,610,808 A * 3/1997 Squires et al. .............. 364/131
5,644,729 A * 7/1997 Amini et al. ............... 710/128
5,825,774 A * 10/1998 Ready et al. ............... 370/401
5,841,418 A 11/1998 Bril et al. ...................... 345/3
5,963,192 A 10/1999 Wong et al. ................ 345/150
6,054,980 A 4/2000 Eglit .......................... 345/204
6,163,818 A * 12/2000 Nguyen et al. ............... 710/22

* cited by examiner

*Primary Examiner*—Matthew C. Bella
*Assistant Examiner*—Mackly Monestine
(74) *Attorney, Agent, or Firm*—Kenyon & Kenyon

(57) ABSTRACT

A method and apparatus for preventing over-prefetching from a buffer receives an address of a last data set item in a data buffer, and reads data from the data buffer into a read streamer buffer starting at a data buffer start address until the address of said last item.

29 Claims, 6 Drawing Sheets

READ STREAMER 111

MANAGING PREFETCHING FROM A DATA BUFFER

FIELD OF THE INVENTION

Embodiments of the present invention provide a method and apparatus for managing prefetching from a data buffer. In particular, the present invention provides a method and apparatus for preventing a read streamer from over-prefetching data from a data buffer.

BACKGROUND OF THE INVENTION

When data is read from a buffer for use by another device, it is sometimes necessary to first prefetch the data into an intermediary buffer before writing the data to the device. An example is when a buffer has a latency time that cannot be tolerated by the device and an intermediary buffer is able to write the data to according to the requirements of the device.

One situation necessitating prefetching is a system that buffers the display data for a double-layer supertwist nematic (DSTN) display panel in system memory. A DSTN display panel is a passive-matrix LCD display and is available on many types of laptop computers. In a system with a DSTN display, display data is written to both one half of the display panel and to a buffer in memory, with the data written to the buffer later read out to refresh the display panel. The buffer contains up to one half a screen (referred to as a half frame) worth of display data, and is therefore referred to a half frame buffer. The architecture of some DSTN systems requires that the display data be buffered in system memory. In some systems, the display data in the half frame buffer cannot be written from the system memory directly to the DSTN display panel because the display panel requires that data be fed to it at a known and fixed delay. For this reason, the data is first prefetched by a read streamer. The read streamer prefetches the display from the half frame buffer, stores it in an intermediary read streamer buffer, and feeds it to the DSTN display.

Problems can occur if a read streamer prefetches from the buffer beyond the end of the display data that was written to the buffer. Not only does such unnecessary reading waste bandwidth, but the buffer into which the read streamer prefetches data is left with redundant data and must be flushed before prefetching new data. It is difficult to implement a mechanism to get rid of the redundant data when new data is written to the same locations in the buffer just after the data is prefetched. Moreover, it can be difficult to flush the read streamer buffer if it is written to and read from in different clock domains. The problem of over-prefetching from a buffer is a particular concern when the size of the buffer is not fixed in advance, for example where the data in the buffer is for a display panel and the application software can change the size of the area on the panel being used to display images.

Another problem that occurs in fetching data from the half frame buffer in some DSTN systems is that there may be an intolerable delay between the complete writing of a half frame of data to the half frame buffer and the time it takes for the read streamer to prefetch that data from the buffer and write it to the DSTN display panel. In particular, in these systems the read streamer buffer is unable to prefetch the data for the upper half of the DSTN display panel fast enough after the completion of the writing of that half frame of data to the half frame buffer. This problem typically does not occur when prefetching the data for the lower half of the DSTN display panel because the data can be prefetched during the vertical blanking period of the DSTN display panel, which is the period of time it takes for the display scanner to move from the lower right hand corner of the screen (where it just finished scanning the lower half panel) to the upper left hand corner (where it will begin scanning the upper half panel).

Based on the foregoing, there is a need for a method and apparatus that prevents overprefetching from a buffer. There is also a need to begin prefetching the data for the upper half frame from the half frame buffer in a DSTN system so as not to delay the scanning of the upper half frame.

SUMMARY OF THE INVENTION

Embodiments of the present invention provide a method and apparatus for preventing over-prefetching from a buffer. A data buffer address for a last item in a data set is received. The data from a data buffer is read into a read streamer buffer starting at a data buffer start address until the address of the last data item in the data set. In one embodiment of the invention, the address of the last data item is determined by a write steamer based on a signal indicating that the last item in the data set has been sent to the write streamer.

DETAILED DESCRIPTION

Figure 1:
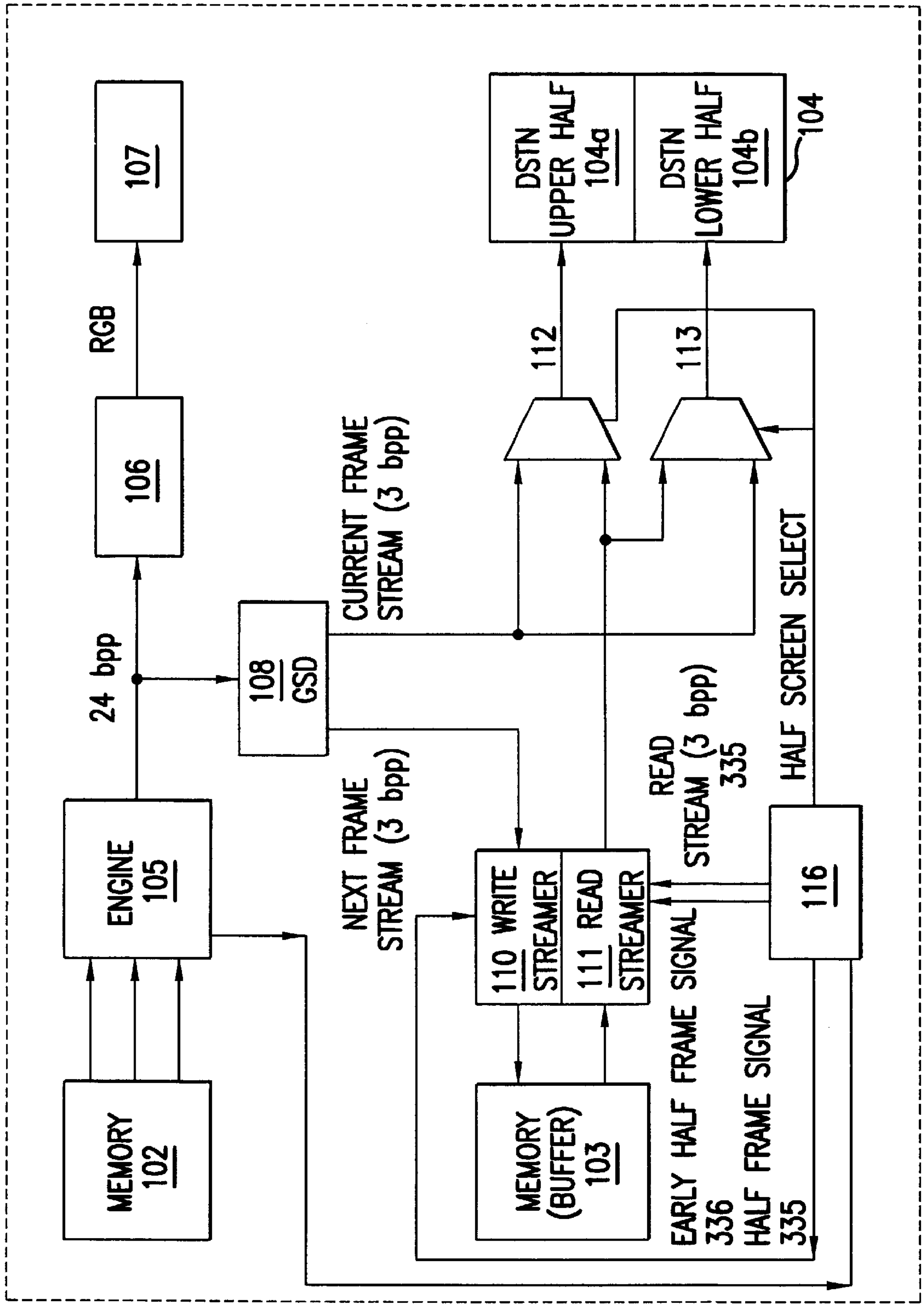
FIG. 1 is a block diagram of a computer having a DSTN display panel according to an embodiment of the present invention.

FIG. 1 is a block diagram of a computer having a DSTN display panel according to an embodiment of the present invention. FIG. 1 shows a computer 101 that has a DSTN display panel 104. A memory 102 is coupled to a display engine 105. The term "coupled" is intended to encompass and be broader than the term "directly connected." If A is directly connected to B, and B is directly connected to C, then A is said to be "coupled" to C. In other words, the term coupled includes the term "indirectly connected."

In this embodiment, the display engine 105 may be coupled to a display driver 106 and a gray scale device 108. The display driver 106 may be coupled to a cathode ray tube (CRT) display 107. In other embodiments, the computer does not have a CRT display and the only display device is the DSTN display panel 104. Grey scale device 108 is coupled to write streamer 110, upper-half multiplexer 112, and lower-half multiplexer 113. The write steamer is coupled to memory 103. Memory 103 can be, for example, a Random Access Memory (RAM). In this embodiment, memory 103 is the system memory for computer 101.

Memory 103 may be coupled to read streamer 111, which in turn may be coupled to upper-half multiplexer 112 and lower-half multiplexer 113. The upper-half multiplexer 112 may be coupled to the upper-half of the DSTN display panel 104*a,* and the lower-half multiplexer may be coupled to the lower-half of the DSTN display panel 104*b.* Half screen selection logic 116 may be coupled to display engine 105, write streamer 110, read streamer 111, upper-half multiplexer 112, and lower-half multiplexer 113.

Effectively, the DSTN panel is refreshed twice for every frame that is displayed on the CRT screen. The regular display stream provides the pixel stream for the current frame F as well as the pixel stream to be used the next time this frame is displayed. The display data for a frame F is written to both a half panel of the DSTN and to a half frame buffer in memory. For example, while the top half panel is being written with "current" data, the bottom half panel is refreshed from the half frame buffer with the data stored earlier for that half panel. After the half panels are completely written, they switch streams. The current data is written to the bottom half panel (and to the buffer) while the top half panel is refreshed from the data previously stored in the buffer.

In operation, memory 102 sends display data to display engine 105, which writes a steam of pixel data to display driver 106 and gray scale device 108. In one embodiment, the steam contains 24 bpp (bits per pixel) of pixel data. Display driver 106 displays the images on CRT display 107. Grey scale device 108 gray scales the 24 bpp of pixel data and generates a data steam. In one embodiment, this stream contains a 3 bpp of pixel data. Each pixel may be represented by three bits (e.g., red, green, and blue). The same 3 bpp data stream may be written to upper-half multiplexer 112, lower-half multiplexer 113, and similar data may be written to write steamer 110. Assume that the current frame data is written to upper-half panel 104*a*. In this case, half screen selection logic 116 selects the current frame stream in upper-half multiplexer 112. Thus, upper-half multiplexer 112 writes the data from the gray scale device 108 to the upper-half of the DSNT display panel 104*a*. Similar data that is being written to upper-half panel 104*a* may be written by write streamer 110 to a half frame buffer in memory 103. At the same time, read streamer 111 reads the data stored during the last frame from the half frame buffer and writes this data to upper-half multiplexer 112 and lower-half multiplexer 113. Half screen selection logic 116 selects the read stream in lower-half multiplexer 113, which writes the data from the last half frame to the lower-half of the DSNT display panel 104*b*.

Display engine 105 sends a signal to half screen selection logic 116 when the upper-half frame has been completed, and half screen selection logic 116 then switches the selections of the multiplexers. The current frame stream from gray scale device 108 will be feed to the lower-half of the DSTN panel 104*b,* and the data from the last frame may be read (by read streamer 111) from the buffer in memory 103 and feed to the upper-half of the DSTN panel 104*a*. Half screen selection logic 116 sends a half frame signal 335 to write streamer 110 and an early half frame signal 336 to read streamer 111, which as discussed below causes the write streamer and read streamer to start the next frames.

Figure 2:
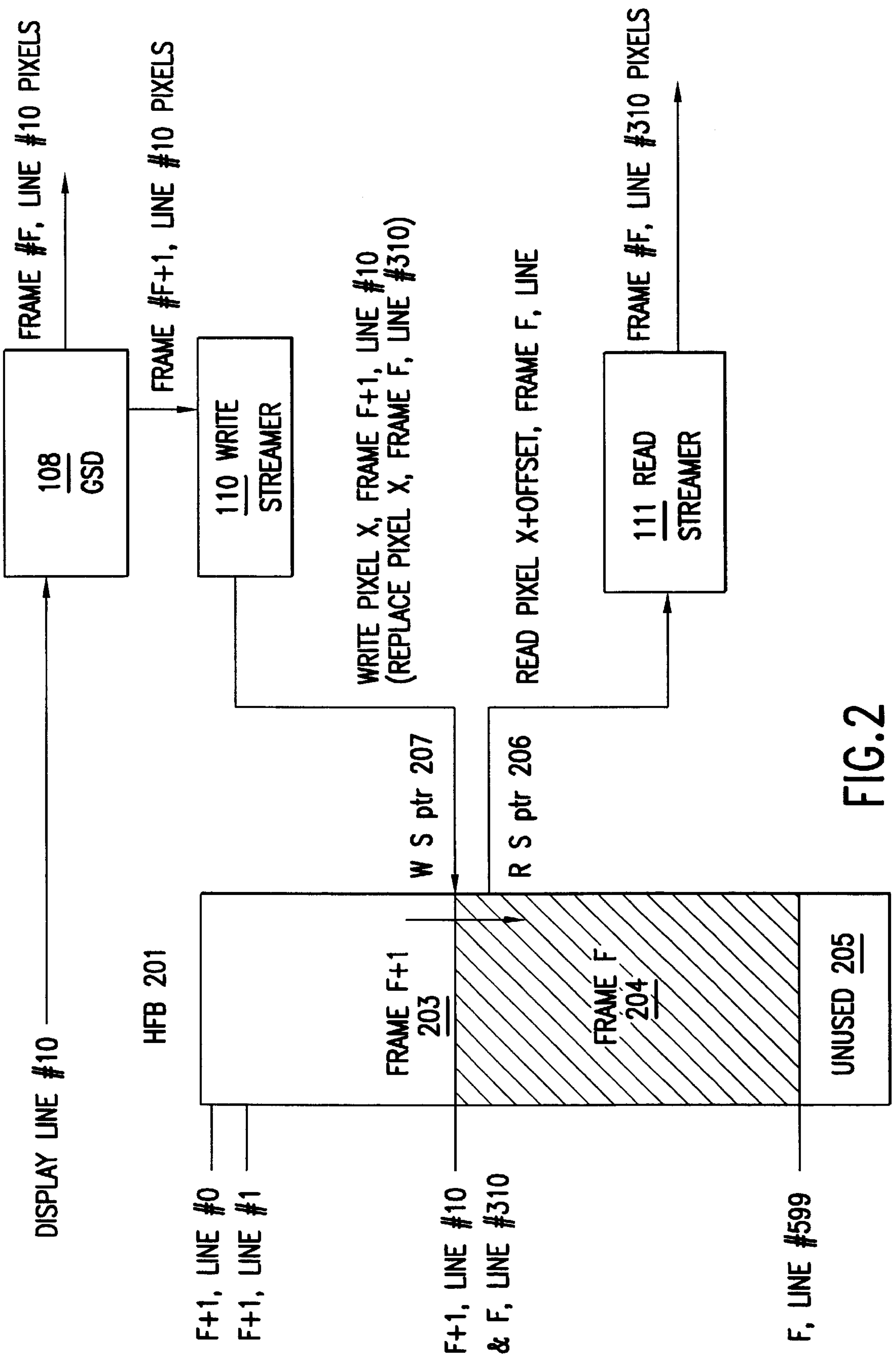
FIG. 2 is a block diagram of a buffer, a write streamer, and an interlocked read streamer in accordance with one embodiment of the present invention.

FIG. 2 is a block diagram of a buffer, a write streamer, and an interlocked read streamer in accordance with one embodiment of the present invention. FIG. 2 shows a half frame buffer 201, write streamer 110, and interlocked read streamer 111. Half frame buffer 201 may be located in memory 103 of FIG. 1. (In this case, the only part of memory 103 shown in FIG. 2 is half-frame buffer 201.) FIG. 2 shows gray scale device 108 coupled to write streamer 110, which writes into half frame buffer 201. In this embodiment, write streamer pointer 207 points to the location in half frame buffer 201 that is written to by write streamer 110. Read streamer 111 reads from half-frame buffer 201. Read streamer pointer 206 points to the location in half frame buffer 201 read from by read streamer 111.

For illustrative purposes, assume that the DSTN display has 600 horizontal lines (i.e., 600 rows of pixels), which means that each half buffer would have 300 lines. The eleventh line down from the top of upper-half screen 104*a* of FIG. 1 is DSTN panel line 10, and the eleventh line down from top of lower-half screen 104*b* is DSTN line 310. Two successive DSTN display frames (i.e., two screens of data) can be represented by F and F+1, with frame F+1 being displayed immediately after frame F.

As discussed above, display data may be written by the display engine 105 to gray scale device 108. Assume for example that DSTN display line 10 may be written to gray scale device 108, and that frame F is currently being displayed on the DSTN display panel. As shown in FIG. 2, display line 10 may be written by gray scale device 108 to the DSTN display panel and may become line 10 of frame F on the display panel. At the same time, line 10 may be written to write streamer 110. The data written by the write steamer later forms line 10 for frame F+1. In one embodiment, the data written to write streamer 110 for line 10 of frame F+1 is similar to the data written to the DSTN screen for line 10 of frame F, but the data written to write streamer 110 is different to accommodate the fact that is will be displayed later.

Write streamer 110 writes the data for line 10 of frame F+1 to half frame buffer 201. The data replaced in the half frame buffer is the data for line 310 of frame F, which has already been read from the half frame buffer and sent to the display panel. At this point, the data 203 for the first eleven lines (0–10) of frame F+1 have been written to half frame buffer 201. At the same time, read streamer 111 may be prefetching the data 204 for frame F from half frame buffer 201 into an intermediate read stream buffer (shown in FIG. 3). The write streamer and read streamer are "interlocked" because they are both writing to and reading from the half frame buffer at the same time. The data prefetched by the read streamer was written to the half frame buffer during the last frame. The read pointer 206 may be offset from write pointer 207. In one embodiment, the size of the display data for a half frame may be known in advance. In this case, the end address for the display data may be hard-wired or hard-coded into read streamer 111 so that read streamer 111 will stop prefetching when it gets to the end of the display data. In another embodiment, the size of the display data for a half frame on the DSTN display panel may be variable. An example may be when the user of a computer is able to adjust the horizontal and vertical sizes of the display field for the DSTN display panel. In this case, the buffer must be larger than the data set and has an unused portion 205. When the size of the data set is variable, the read streamer must keep track of the size of the data set or it will over-prefetch data from the data buffer (i.e., it will prefetch beyond the end of the data set written by the write streamer).

Figure 3:
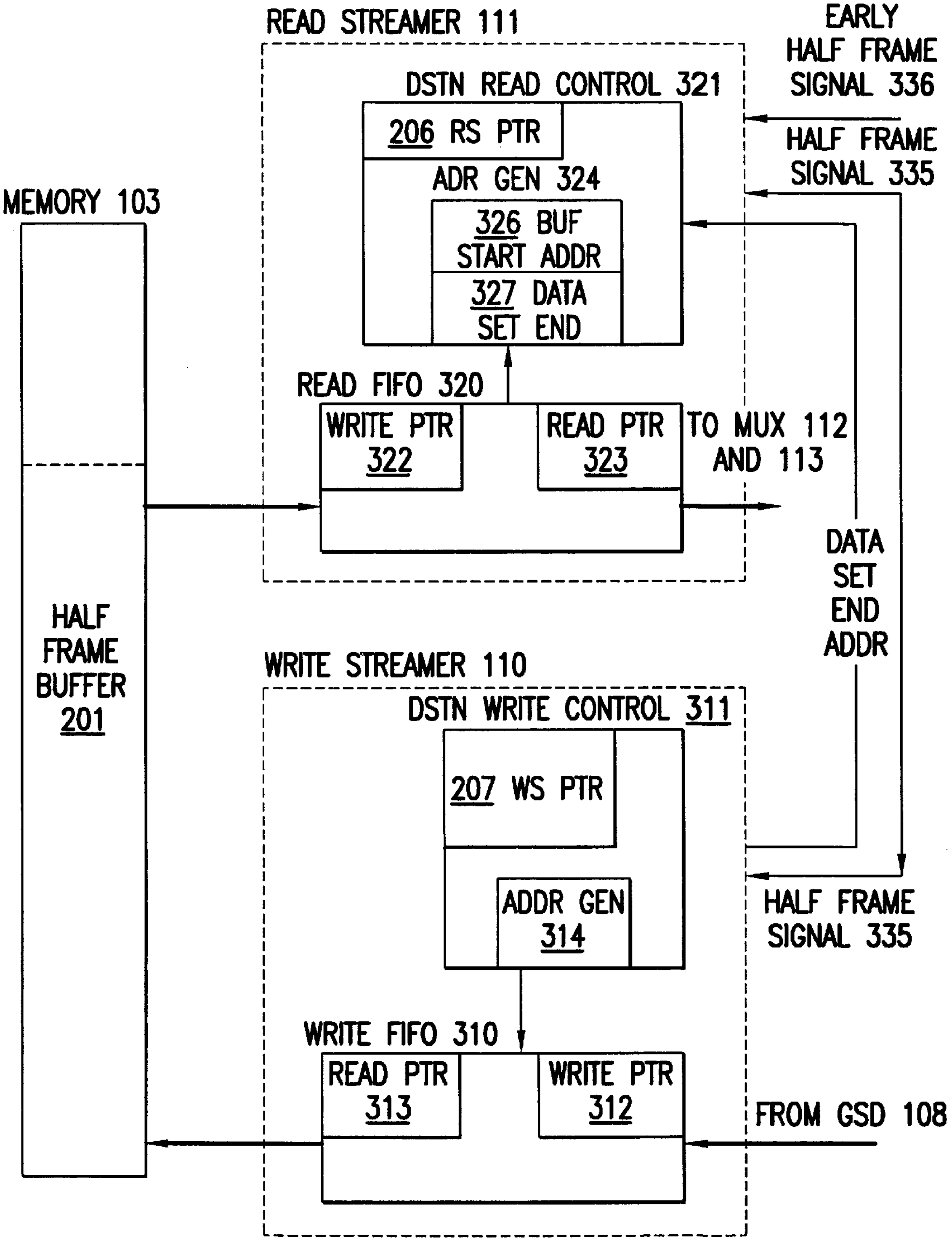
FIG. 3 is a more detailed block diagram of a buffer, a write streamer, and an interlocked read streamer in accordance with one embodiment of the present invention.

FIG. 3 shows one embodiment of an apparatus for controlling prefetching from a buffer. As discussed above, write streamer 110 may be coupled to memory 103, which maybe coupled to read streamer 111. Memory 103 contains half frame buffer 201. Write streamer 110 may be comprised of write FIFO 310 and write streamer control device 311. As is known in the art, a FIFO is a queue in which the first item placed in the queue is the first item taken out. Write FIFO 310 may be any commercially available FIFO device. It does not need to be large because data will be read out soon after it is written in. Write FIFO 310 contains write pointer 312, which points to the address in the FIFO that is being written into by gray scale device 108 (not shown), and read pointer 313, which points to the address in the FIFO that is being read from when writing to memory 103. In this embodiment, write streamer control device 311 contains write streamer pointer 207, which points to the address in memory 103 that is being written to by write streamer 110, and address generator 314.

Read streamer 111 may be comprised of read FIFO 320 and read streamer control device 321. Read FIFO 320 contains read pointer 323, which points to the address in the FIFO that is being read from, and write pointer 322, which points to the address in the FIFO that is being written into from memory 103. Read FIFO 320 may be any commercially available FIFO, and may be a small FIFO device. In this embodiment, read steamer control device 321 contains read streamer pointer 206, which points to the address in memory 103 that is being read from by the read streamer. Read streamer control device 321 also contains address generator 324, which may have a buffer start address element 326 and data set end element 327.

In operation, write streamer 110 receives a half frame signal 335 from half screen logic 116 (not shown in FIG. 3) when the display engine 105 is about to generate the first pixel for the next half frame. When write streamer control device 311 receives the half frame signal, address generator 314 may be reset to the start address of half frame buffer 201. Address generator 314 keeps track of the last address written to by write streamer 110. The address generator 314 and write streamer pointer 207 may be set to the start address of the buffer in memory 103 on system start-up and when the write streamer pointer 207 has reached the end of the display data in memory 103. Write streamer 110 receives the display data for the next frame from gray scale device 108. This data may be received as single data items or blocks of multiple data items. This data may be written into the address in write FIFO 310 pointed to by write pointer 312, with the write pointer being incremented each time an item is written to the write FIFO. Address generator 314 may also be incremented each time an item or block of items is written to half frame buffer 201 by the size of the items or block of items. The item of data at the location pointed to by read pointer 313 may be read from write FIFO 310 and written to the address pointed to by write streamer pointer 207, with read pointer 313 and write steamer pointer 207 being incremented each time that an item of data is written to memory 103.

At the same time, read streamer 111 may be reading data from memory 103 and writing data to multiplexers 112 and 113 (not shown in FIG. 3). On system start-up, the start address for the buffer may be written to buffer start address element 326 and read streamer pointer 206, and the end address for the display data buffer may be written to data set end element 327. Data items are read from the address in memory 103 pointed to by read streamer pointer 206, and written into the address in read FIFO 320 pointed to by write pointer 322. Each time an item is read from the memory 103 the read streamer pointer 206 may be incremented, and each time an item is written to read FIFO 320 the write pointer 322 may be incremented. The item pointed to by read pointer 323 may be read from FIFO 320 and written to multiplexers 112 and 113, with read pointer 323 incremented each time an item is read from read FIFO 320. Each time that read streamer pointer 206 is incremented, it is compared to data set end element 327. If the value in the read streamer pointer 206 reaches the value in the data set end element 327, read steamer pointer 206 may be set to the value stored in buffer start address element 326.

As discussed above, when in one embodiment the display engine 105 has sent the last pixel in a half frame to write streamer 110, and is about to generate the first pixel for the next half frame, half screen logic 116 sends half frame signal 335 to write streamer 110. For example, the half frame signal may be sent when display engine 105 has generated the pixel data for the pixel on the last line of upper-half panel **104*a* (e.g., the last pixel in line 300) and will next generate the first pixel for lower-half panel 104*b* (e.g., the first pixel in line 301). This signal may be received by write streamer control device 311. The data set end value in address generator 314 may be written to read streamer control device 321 and stored in data set end element 327. When read streamer pointer 206 reaches this address, it will be reset to the buffer start address stored in buffer start address element 326 and will start reading the display data for the next half frame. In an alternative embodiment, write streamer control device 311 sends to read streamer control device 321 the amount of data written to the buffer instead of the data set end address. The read steamer control device then adds the amount of data written to the buffer start address 326** in order to determine the data set end address.

FIG. 3 further shows an apparatus for resetting the read streamer pointer to the start address of the half frame buffer before the write streamer has completed writing the display data for the upper half screen according to one embodiment of the present invention. Read streamer 111 is not able to wait for write streamer 110 to finish writing the data for the upper half frame before the read streamer starts to prefetch this data. If the read streamer were to wait, it would not be able to feed the data fast enough to the DSTN display and the functionality would be degraded. Although the read streamer 111 is able to wait for the write streamer 110 to complete writing the data for the lower half frame (because the DSTN display scanner already is delayed by the vertical blanking period), in one embodiment the read streamer may also receive an early half frame signal for the lower half frame. Read streamer 111 in FIG. 3 is shown at a higher point in half frame buffer 201 than write streamer 110. The write steamer 110 is writing the data to be later used as the last lines of display data for the upper half screen of frame F+1, while the read streamer 111 is prefetching the first lines of the display data for the upper half screen of frame F+1. At this point, the read streamer 111 has already prefetched the last lines of data for the lower half screen of frame F.

The operation of this embodiment of the invention will now be described. As shown in FIG. 2, the read streamer 111 prefetches the data for the lower half of frame F while the write streamer 110 may be writing the data for the upper half of frame F+1. When the scanner reaches a certain level in the upper half of DSTN panel **104*a* (shown in FIG. 1), an early half frame signal 336 (shown in FIG. 3) may be sent to read streamer control device 321. For example, in one embodiment the early half frame signal 336 may be sent when the scanner is beginning the last line in upper half of DSTN panel 104*a* (e.g., line 299). The signal is an "early" half frame signal because it is sent before the scanner has reached the end of the upper half frame. When the scanner reaches the end of the upper half frame of DSTN panel 104*a* or the end of the lower half frame of DSTN panel 104*b*, a half frame signal 335 maybe sent to read streamer control device 321 and to write streamer control device 311**.

According to this embodiment, when the read streamer control pointer 206 reaches the address stored in data set end address element 327, the read streamer control device checks to see if it has received the early half frame signal 336 or half frame signal 335. If neither signal has been asserted, read streamer control device 321 waits for one of these signals to be received. When the read streamer control pointer 206 reaches the address stored in data set end address element 327 and the read streamer control device has received the early half frame signal 330, or half frame signal 335, the read streamer control device resets the read streamer pointer 206 to the addressed stored in buffer start address element 326 and starts to prefetch data for the first line of the next half frame. When the system is reset, the read streamer pointer 111 may be reset approximately one half frame after write streamer 110 is reset. In particular, the read streamer 111 starts reading from the half frame buffer 201 when the write streamer is writing the last line of the upper half frame 104*a*. Data should not be read out of the read streamer FIFO 320 until before the next half frame.

In one embodiment, the read stream control device 321 does not begin reading from the first line in half frame buffer 201 until the read streamer FIFO 320 reaches its watermark. When the read streamer FIFO reaches its watermark, there are enough free places in the FIFO to issue a read request from half frame buffer 201. Read streamer FIFO 320 may be considered to reach its watermark when the number of valid entries in the FIFO is less than or equal to the watermark. The number of valid entries in read streamer FIFO 320 may be calculated by comparing the FIFO address in write pointer 322 and read pointer 323.

Figure 4A:
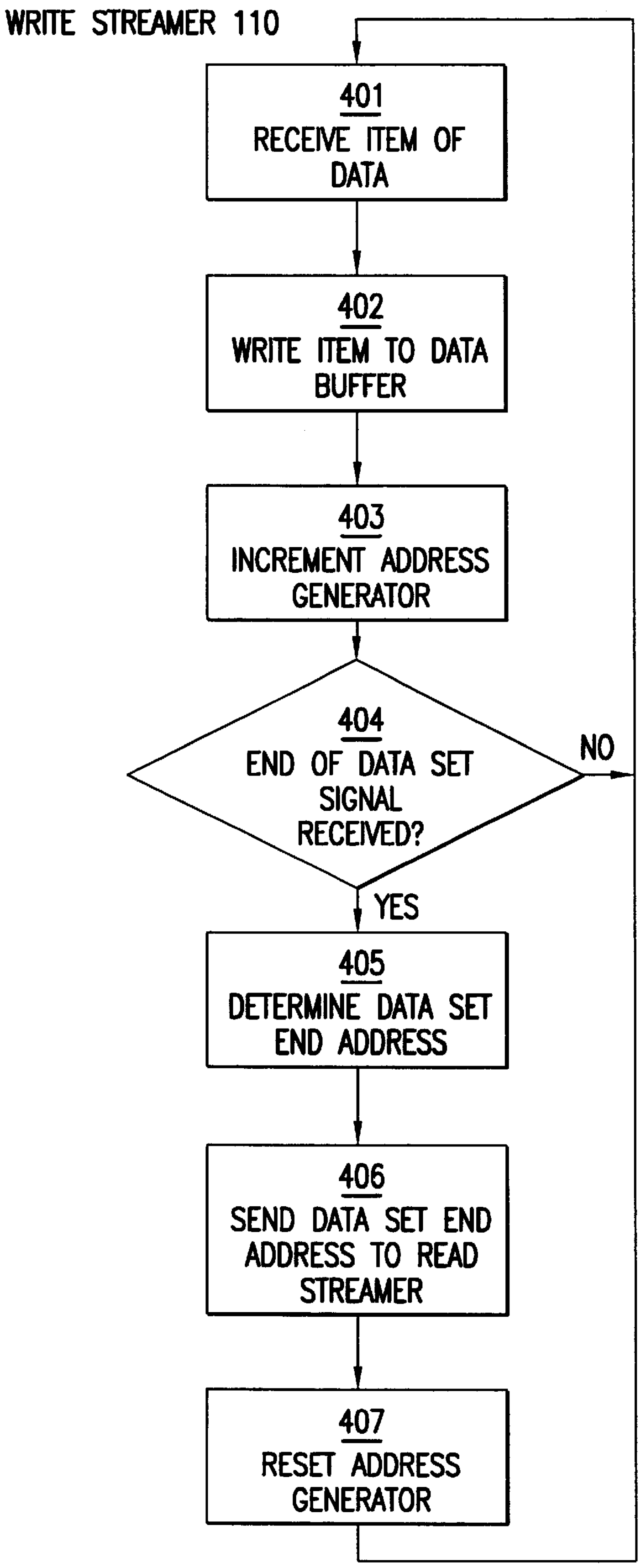
FIGS. 4A and 4B are flow diagrams of a method for preventing over-prefetching from a buffer in accordance with one embodiment of the present invention.
Figure 4B:
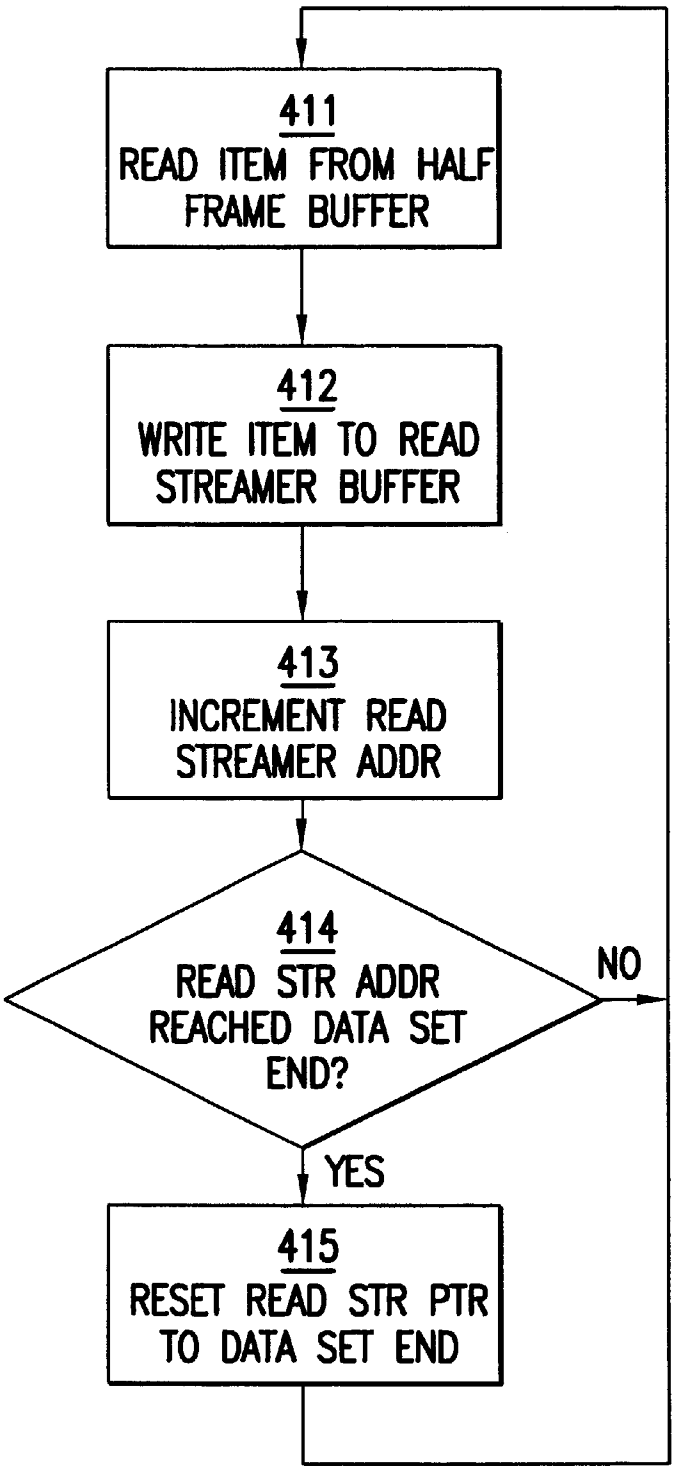

FIGS. 4A and 4B are flow diagrams of a method for preventing over-prefetching from a buffer in accordance with one embodiment of the present invention. Write streamer 110 receives an item of data at 401 and writes it to the data buffer at 402. In order to later determine the data buffer address of the last item of data in the data set, the address generator is incremented at 403. At 404, the write streamer determines if an end of data set signal has been received. If not, it processes the next item of data at 401. If an end of data set signal was received, the write streamer determines the data set end address at 405 and sends the data set end address to the read steamer at 406. The write streamer will then reset the address generator at 407 and processes the next item of data at 401.

At the same time, read streamer 111 may be prefetching an item of data from the data buffer at 411 and writing that data item to the read steamer buffer at 412. The read streamer pointer is then incremented at 413. At 414, the read streamer determines if the read streamer address has gone beyond the end of the data set in the buffer. If not, the read streamer processes the next data item at 411. If the read streamer address has gone beyond the end of the data set in the buffer, then at 415 the read streamer pointer is reset to the buffer start address and at 411 the read streamer processes the next data item.

Figure 5:
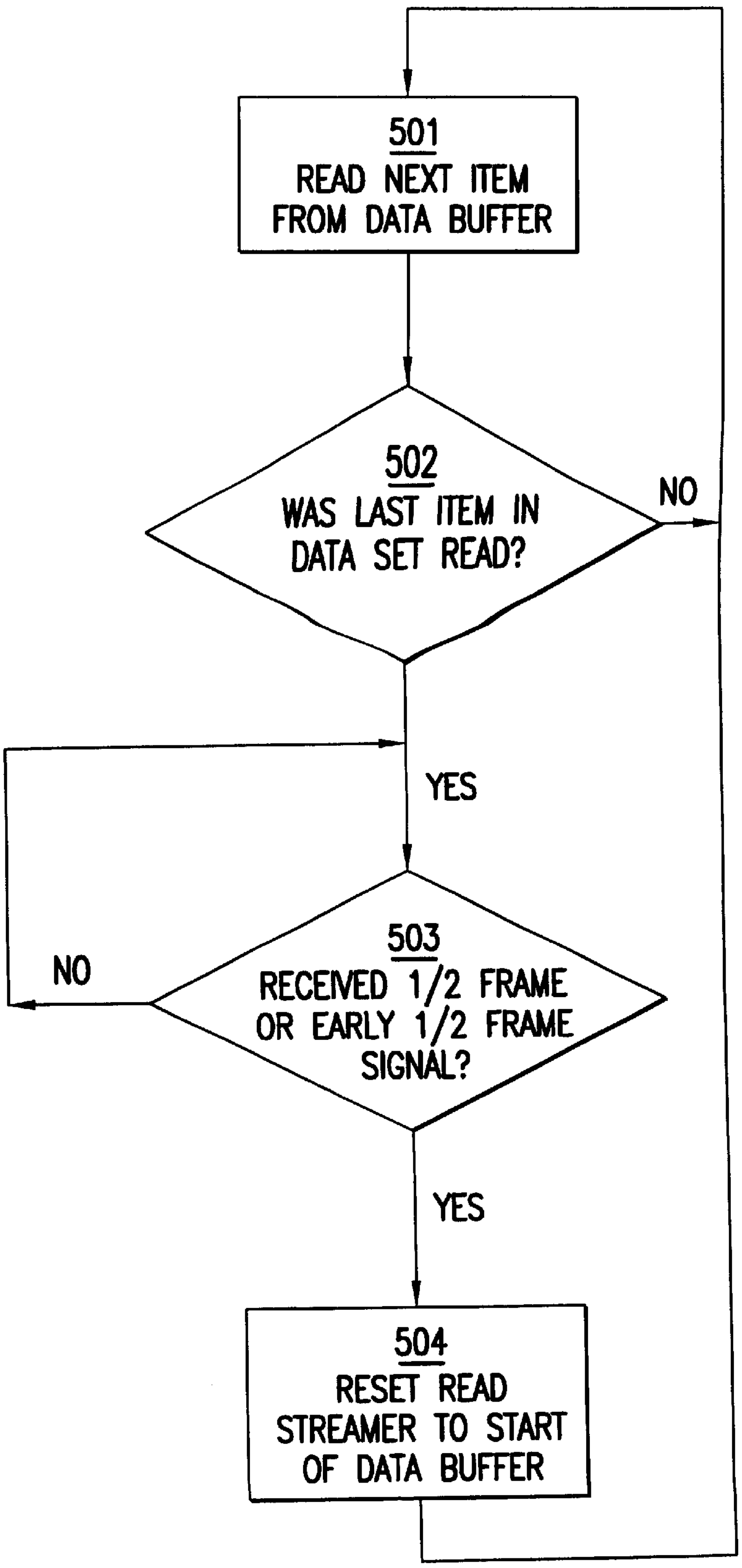
FIG. 5 is a flow diagram of a method for resetting a read streamer to the start address of a half frame buffer before the write streamer completes writing the display data for the current half screen according to one embodiment of the present invention.

FIG. 5 is a flow diagram of a method for resetting a read streamer to the start address of a half frame buffer before the write streamer completes writing the display data for the upper half screen according to one embodiment of the present invention. At 501, the read streamer reads (i.e., prefetches) an item of data from the data buffer. At 502, the read steamer determines if the last item in the data set was read from the data buffer. If not, the read streamer reads the next item from the data buffer at 501. If the last item in the data set was read, at 503 the read streamer determines if a half frame signal or early half frame signal was received. If not, the read streamer continues to check for the half frame signal or early half frame signal until one of these signals is received. When either the half frame signal or early half frame signal is received, then at 504 the read streamer is reset to the start of the data buffer and the next item is read from the data buffer at 501.

The present invention provides a method an apparatus for preventing the read streamer from over prefetching data from the data buffer. That is, it prevents the read streamer from fetching beyond the end of the data set written by the write streamer. This invention also provides a method an apparatus for starting prefetching of the display data for the upper half frame before the display data for the upper half frame is completely written to the data bus. Several embodiments of the present invention are specifically illustrated and/or described herein. However, it will be appreciated that modifications and variations of the present invention are covered by the above teachings and within the purview of the appended claims without departing from the spirit and intended scope of the invention. For example, although embodiments disclose a system and method for preventing over-prefetching of display data for a DSTN display panel, the present invention can also be used to prevent over-prefetching of other types of data from a data buffer. In addition, although embodiments disclose that the write streamer control device provides the data set end address to the read streamer control device, in another embodiment the write streamer control device provides the amount of data in the data set to the read streamer control device.

What is claimed is:

1. A method for preventing over-prefetching from a buffer, comprising:

receiving items of data in a data set, the data set having a last item;

writing the items of data to a data buffer;

receiving a signal indicating that an item of data received is the last item in the date set;

determining an address in the data buffer for said last item based on said signal; and reading data into a read streamer buffer from said data buffer starting at a data buffer start address until the address of said last item, wherein said read streamer buffer is part of a read streamer, and wherein said read streamer further comprises a read steamer control device.

2. The method of claim 1, wherein said receiving items of data further comprises writing the items of data into a write streamer buffer; and wherein said writing the items of data to a data buffer further comprises writing the items of data from said write stream buffer to said data buffer.

3. The method of claim 1, wherein the data set has a size, and wherein the size of the data set is variable and may be changed during system operation.

4. The method of claim 1, wherein data is read from the data buffer into the read streamer buffer while data is written to the data buffer.

5. The method of claim 1, further comprising writing the data from the read streamer buffer to a double-layer supertwist nematic display panel.

6. The method of claim 5, wherein said data buffer is stored in system memory.

7. The method of claim 1, wherein the data buffer has a first item, and wherein the method further comprises:

receiving an early half frame signal indicating that a last line in an upper half frame of a double-layer supertwist nematic display is being scanned; and after receiving the early half frame signal and reading the last item in the data set from the data buffer, resetting a read pointer so that the first item in the data buffer will be next read into the read streamer buffer.

8. An apparatus for storing data in a buffer without over-prefetching from the buffer, comprising:

a first memory to receive a data set having a last item;

a write streamer device coupled to the first memory, wherein the write streamer device has an input to receive a signal indicating that an item of data received is the last item in the data set; and a read streamer device coupled to the first memory and to said write streamer device and having an input to receive an address in be first memory of the last item in the data set from said write streamer device, wherein the read streamer device comprises a read streamer buffer memory and a read streamer control device.

9. The apparatus of claim 8, wherein said read streamer control device contains a read streamer pointer element.

10. The apparatus of claim 8, wherein the write streamer device comprises a write streamer buffer memory and a write streamer control device.

11. The apparatus of claim 10, wherein said write streamer control device contains an item size element and an item counter element.

12. The apparatus of claim 8, wherein said read streamer device further has an input to receive an early half frame signal indicating that a last line in an upper half frame of a double-layer supertwist nematic display is being scanned.

13. The apparatus of claim 8, further comprising a double-layer supertwist nematic display panel coupled to said read streamer device.

14. A method of controlling prefetching of data from a data buffer, comprising:

receiving an early half frame signal indicating that a last line in an upper half frame of a double-layer supertwist nematic display is being scanned;

reading a last item of data in a data set from a data buffer into a read streamer buffer; and after said receiving and reading, resetting a read streamer so that the read streamer starts reading from the data buffer beginning at a first item in said data buffer.

15. The method of claim 14, wherein said early half frame signal is received before the last item of data in the data set is read from the data buffer.

16. The method of claim 14, further comprising determining whether a read streamer FIFO has reached its watermark; and wherein said resetting is not performed until after the read streamer reaches its watermark.

17. The method of claim 14, wherein an address of said last item of data is determined based upon a message received from a write streamer.

18. The method of claim 14, wherein said resetting the read streamer comprises resetting a read streamer pointer to a first address in said data buffer.

19. The method of claim 14, further comprising:

reading items of data from the data buffer starting from the first item in the data buffer and continuing until the last item in the data set is read;

writing items of data for a current half frame being displayed on a double-layer supertwist nematic display to the data buffer; and after said reading items of data from the data buffer and said writing items of data are performed, resetting the read streamer so that the read streamer starts reading from the data buffer beginning at the first item in said data buffer.

20. A computer, comprising:

a display engine;

a display panel coupled to said display engine;

a first memory;

a write streamer device coupled to said display engine and said first memory, said write streamer comprising a write streamer buffer memory and a write steamer control device;

a read streamer device coupled to said first memory and said display panel, said read streamer comprising a read streamer buffer memory and a read steamer control device;

wherein said read steamer control device is coupled to said write streamer control device, and said read steamer has an input to receive an address in the first memory of a last data item in a data set from said write streamer control device.

21. The computer of claim 20, wherein said display panel is a double-layer supertwist nematic display panel.

22. The computer of claim 20, wherein said memory device is the system memory.

23. The computer of claim 20, wherein said read streamer device further has an input to receive an early half frame signal indicating that a last line in an upper half frame of a doublelayer supertwist nematic display is being scanned.

24. A read streamer apparatus, comprising:

an input to receive an early half frame signal indicating that a last line in an upper half frame of a double-layer supertwist nematic display is being scanned;

an input to read a last item of data in a data set from a data buffer into a read streamer buffer; and a controller to reset the read streamer, after receiving the early half frame signal and reading the last item of data in the data set, so that the read streamer starts reading from the data buffer beginning at a first item in said data buffer.

25. The apparatus claim 24, wherein the input to receive the early half frame signal is adapted to receive the early half frame signal before the last item of data in the data set is read from the data buffer.

26. The apparatus of claim 24, wherein the controller is adapted to determine whether a read streamer FIFO has reached its watermark, and wherein the controller does not reset the read streamer until after the read streamer reaches its watermark.

27. The apparatus of claim 24, wherein the apparatus further comprises an input to receive a message from a write streamer to determine an address of said last item of data.

28. The apparatus of claim 24, wherein said apparatus further comprises a read streamer pointer that is reset by the read stream controller to reset the read streamer.

29. The apparatus of claim 24, wherein the controller is adapted to cause the read streamer to read the items of data from the data buffer starting from the first item in the data buffer and continuing until the last item in the data set is read, to write items of data for a current half frame being displayed on a double-layer supertwist nematic display to the data buffer, and after said read of the last item in the data set and said write of the current half frame being displayed, to reset the read streamer so that the read streamer starts reading from the data buffer beginning at the first item in said data buffer.

* * * * *

UNITED STATES PATENT AND TRADEMARK OFFICE

CERTIFICATE OF CORRECTION

PATENT NO. : 6,515,672 B1 
DATED : February 4, 2003
INVENTOR(S) : Sheaffer et al.

It is certified that error appears in the above-identified patent and that said Letters Patent is hereby corrected as shown below:

Column 9,
Line 12, delete “in be” and insert -- in the --.

Column 10,
Lines 7 and 11, delete “steamer” and insert -- streamer --;
Lines 13 and 15, delete “steamer” and insert -- streamer --;
Line 27, delete “doublelayer” and insert -- double-layer --.

Signed and Sealed this

Sixth Day of January, 2004

JAMES E. ROGAN
*Director of the United States Patent and Trademark Office*